US 6,495,101 B1

United States Patent
Yokoyama et al.

(10) Patent No.: US 6,495,101 B1
(45) Date of Patent: *Dec. 17, 2002

(54) HOLLOW FIBER MEMBRANE OXYGENATOR

(75) Inventors: Kenji Yokoyama, Kanagawa (JP); Takao Anzai, Kanagawa (JP); Atsuo Okumura, Kanagawa (JP); Yuu Kasori, Kanagawa (JP)

(73) Assignee: Terumo Kabushiki Kaisha, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,105

(22) Filed: Oct. 8, 1998

(30) Foreign Application Priority Data

Oct. 9, 1997 (JP) .............................. 9-293248

(51) Int. Cl.[7] .................. A61M 1/14; A61M 37/00; A61M 1/34; B01D 39/00
(52) U.S. Cl. .................. 422/48; 422/45; 604/6.14; 261/DIG. 28; 128/DIG. 23; 210/500.35; 210/500.23; 210/490
(58) Field of Search .............. 422/49, 45, 48; 604/4, 5, 6, 6.13, 6.01; 210/645–646, 650–52, 321.6, 321.62, 322, 323.1, 345, 348, 500.1, 500.27, 500.21–500.24, 500.35–500.36, 490–91; 261/DIG. 328, 83, 94–7; 128/DIG. 3; 435/283.1, 284.1, 297.1–297.2, 297.4

(56) References Cited

U.S. PATENT DOCUMENTS

| 4,871,357 A | 10/1989 | Hsu et al. |
| 5,162,102 A | * 11/1992 | Nogawa et al. ............... 422/48 |
| 5,346,621 A | 9/1994 | Haworth et al. |
| 5,376,334 A | 12/1994 | Haworth et al. |

FOREIGN PATENT DOCUMENTS

| EP | 0 225 811 | 6/1987 |
| EP | 0 420 765 | 4/1991 |
| JP | 4152952 | 5/1992 |
| JP | 04152952 A | * 5/1992 |

* cited by examiner

Primary Examiner—Angela D. Sykes
Assistant Examiner—Patricia Bianco
(74) Attorney, Agent, or Firm—Burns, Doane, Swecker & Mathis, LLP

(57) ABSTRACT

A hollow fiber membrane oxygenator of external blood circulation type has a housing and a lot of porous hollow fiber membranes for gas transfer housed in the housing. In the oxygenator, blood flows along the outer side of the hollow fiber membranes, whereas oxygen-containing gas flows along the inner side thereof. An outer surface or outer layer of the hollow fiber membrane as a blood-contacting portion is coated with synthetic polymer mainly formed of alkoxyalkyl(meta)acrylate containing a C(1–4)alkoxy group and a C(1–4)alkyl group. An intermediate layer and inner layer of the hollow fiber membranes contain substantially no synthetic polymer.

24 Claims, 7 Drawing Sheets

HOLLOW FIBER MEMBRANE OXYGENATOR

BACKGROUND OF THE INVENTION

1. Field of the Invention

The present invention relates to a hollow fiber membrane oxygenator for removing carbon dioxide from blood and oxygenating the blood in an extracorporeal blood circulation and, more particularly, to the hollow fiber membrane oxygenator of external blood circulation type.

2. Description of Related Art

A generally employed hollow fiber membrane oxygenator using porous membrane has been widely applied to a device for extracorporeal blood circulation, a device for assisting cardiopulmonary blood circulation and the like used in cardiotomy operated for cardiopathy. The membrane type oxygenator is composed mainly of hollow fiber membranes through which gas is transferred, i.e., oxygen is admitted into blood and carbon dioxide is removed from blood.

Two methods of blood circulation to the membrane type oxygenator can be used, one is an internal perfusion method and the other is an external perfusion method. The former method allows blood to flow to the inner side of the hollow fiber membranes and gas to flow to the outer side thereof. The latter method allows blood to flow to the outer side of the hollow fiber membranes and gas to flow to the inner side thereof.

The membrane type oxygenator of external perfusion type has become more popular than that of internal perfusion type because of higher mass transfer capability and lower degree of pressure loss. The aforementioned membrane type oxygenator of external perfusion type, however, tends to cause turbulence in the blood flow, which is likely to adversely affect adhesion and activation characteristics of blood platelet. In view of the above-described aspect, the oxygenator of internal perfusion type may be considered to be superior to the external perfusion type.

Japanese Patent Application Laid-Open No. 62-172961 discloses a membrane type oxygenator coated with benzylalkylammonium-heparin composite. This oxygenator, however, causes exfoliation of the composite into blood during its operation.

The above-described oxygenator may be coated with hydrophilic polymer. In such a case, when using porous membranes for gas transfer, the blood plasma component will penetrate into micropores and leak through the membrane, thus degrading gas transfer capability.

Japanese Patent Application Laid-Open No. 4-152952 discloses bio-compatible material formed of alkoxyalkyl (meta)acrylate, which can be applied to the membrane of the membrane type oxygenator. However it is practically difficult to form the hollow fiber membrane for the membrane type oxygenator directly from the alcoxyalkyl(meta) acrylate. If the hollow fiber membrane for the membrane type oxygenator is coated with alkoxyalkyl(meta)acrylate using methanol solution thereof, it flows into micropores of the hollow fiber membrane. As a result, the blood plasma component will penetrate into micropores during operation of the oxygenator and leak through the membrane, thus degrading the gas transfer capability.

SUMMARY OF THE INVENTION

In view of foregoing, it is an object of the present invention to provide a hollow fiber membrane oxygenator of external blood circulation type which minimizes adhesion and activation of the blood platelet and prevents leakage of blood plasma component.

In order to achieve the object, there is provided a hollow fiber membrane oxygenator comprising a housing and a lot of porous hollow fiber having a large number of porous hollow fiber membranes for gas transfer housed in the housing, allowing blood to flow through outer surface of the hollow fiber membrane and oxygen-containing gas to flow through inside thereof. In the hollow fiber membrane oxygenator, an outer surface or an outer layer of the hollow fiber membrane as a blood-contacting portion is coated with synthetic polymer mainly formed of alkoxyalkyl(meta) acrylate containing a C(1–4)alkoxy group and a C(1–4)alkyl group; and an intermediate layer or an inner layer of the hollow fiber membrane has substantially no synthetic polymer existing therein.

In order to further achieve the object, there is provided a hollow fiber membrane oxygenator comprising a housing and a lot of porous hollow fiber membranes for gas transfer housed in the housing, allowing blood to flow through outer surface of the hollow fiber membrane and oxygen-containing gas to flow through inside thereof. In the hollow fiber membrane oxygenator, an outer surface or an outer layer of the hollow fiber membrane as a blood-contacting portion is coated with synthetic polymer mainly formed of alkoxyalkyl(meta)acrylate containing repetitive combination of the unit shown in the following chemical formula 1;

[chemical formula 1]

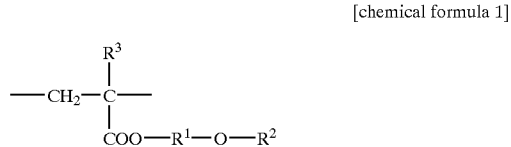

(where $R^1$ represents C(1–4)alkylene, $R^2$ represents C(1–4)alkyl, and $R^3$ represents H or $CH_3$ respectively.) and an intermediate layer or an inner layer of the hollow fiber membrane has substantially no synthetic polymer existing therein.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF THE PREFERRED EMBODIMENTS

The hollow fiber membrane oxygenator of external blood circulation type of the present invention will be described with reference to embodiments.

Figure 1:
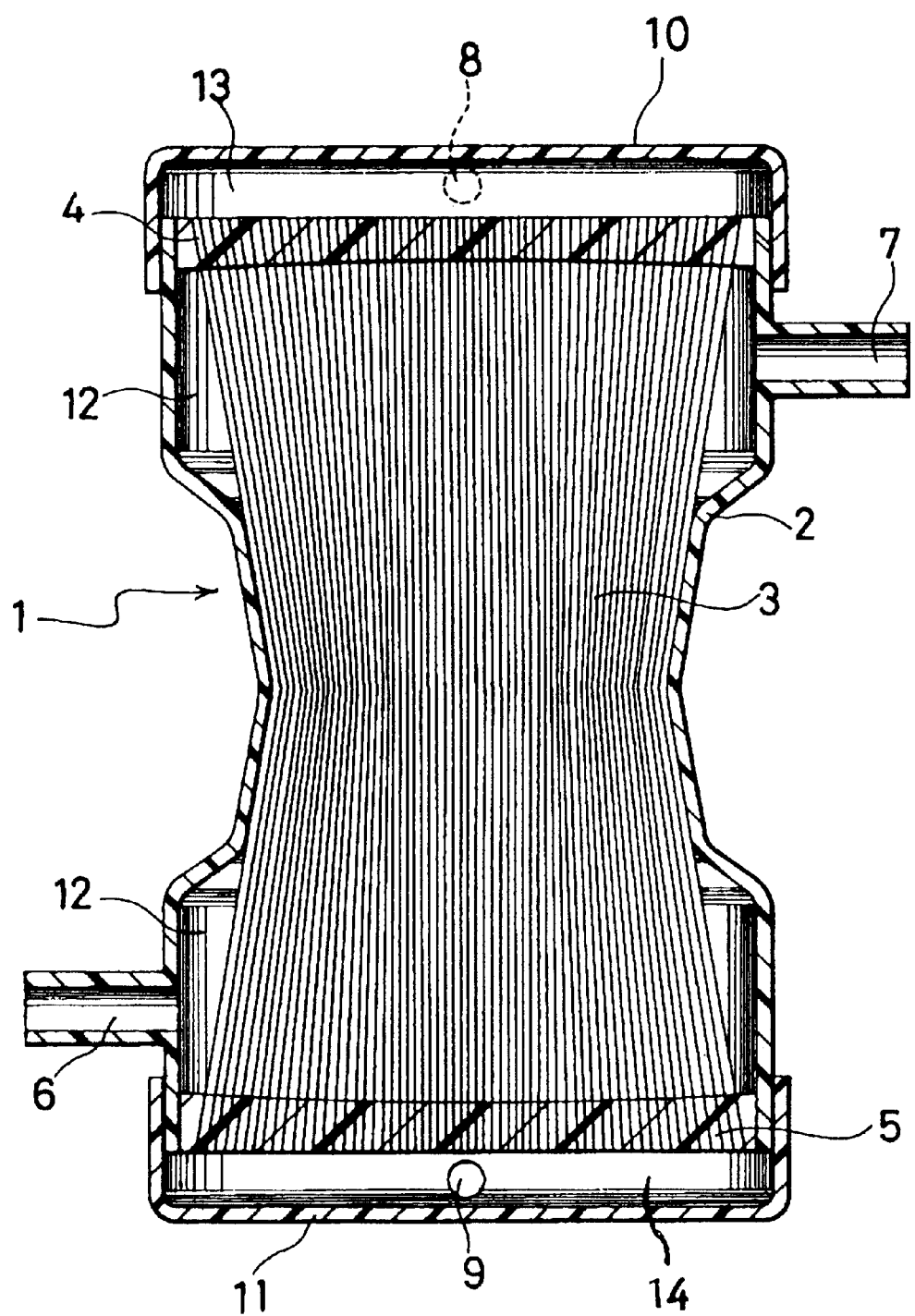
FIG. 1 is a sectional view of an embodiment of a hollow fiber membrane oxygenator of external blood circulation type according to the present invention.
Figure 2:
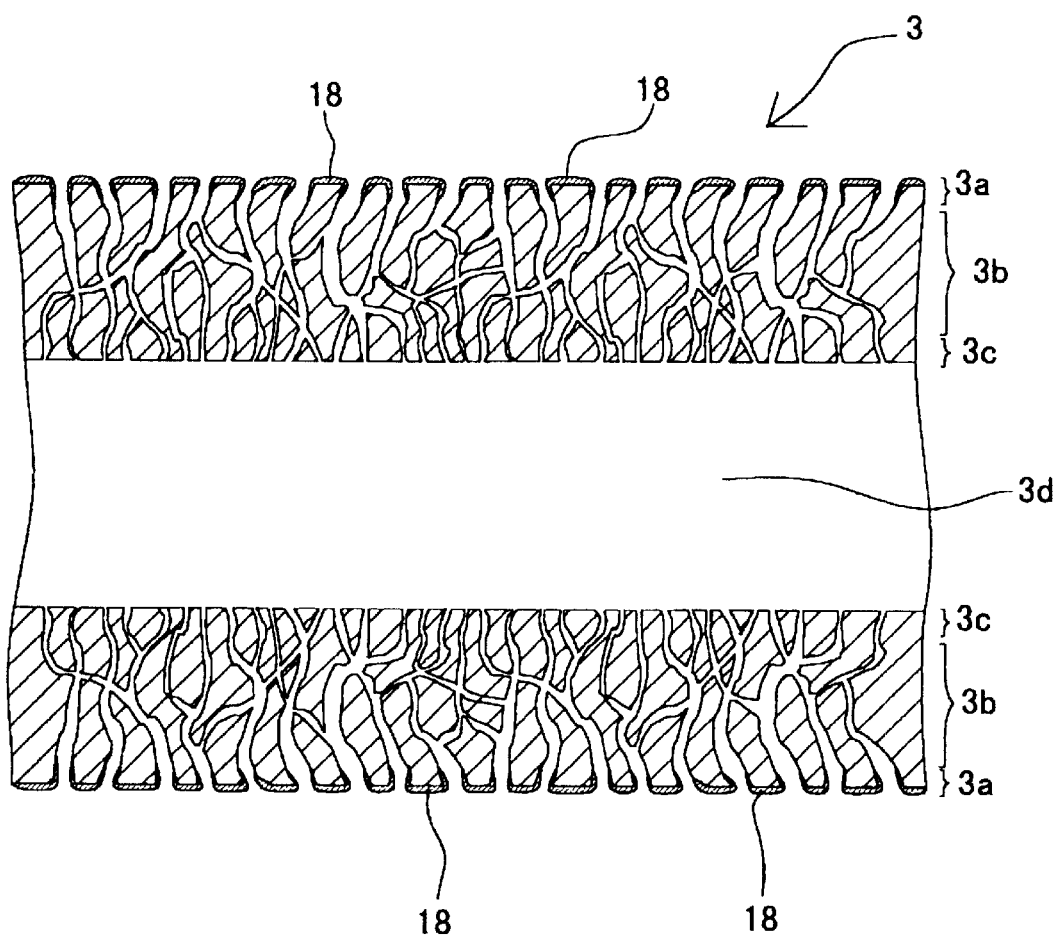
FIG. 2 is an enlarged sectional view of a hollow fiber membrane employed in the hollow fiber membrane oxygenator of external blood circulation type according to the present invention.
Figure 3:
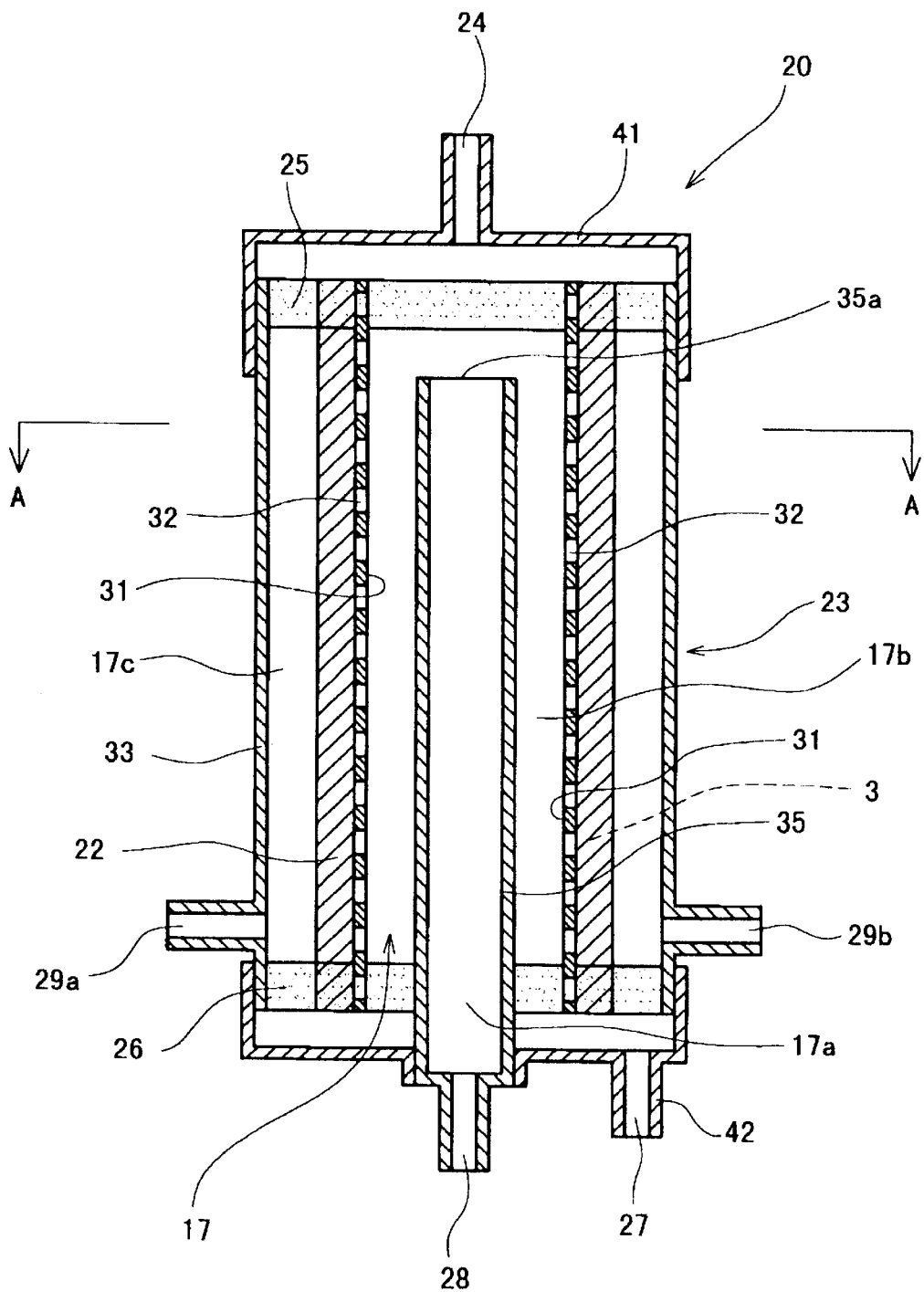
FIG. 3 is a sectional view of another embodiment of the hollow fiber membrane oxygenator of external blood circulation type according to the present invention.

FIG. 1 is a sectional view of an embodiment of the hollow fiber membrane oxygenator of external blood circulation type according to the present invention. FIG. 2 is an enlarged sectional view of a porous hollow fiber membrane for gas transfer, which is employed in the hollow fiber membrane oxygenator of external blood circulation type according to the present invention. FIG. 3 is a sectional view of another embodiment of the hollow fiber membrane oxygenator of external blood circulation type according to the present invention.

A hollow fiber membrane oxygenator of external blood circulation type (hereinafter simply referred to as an oxygenator) 1 has the housing 2 and a lot of porous hollow fiber membranes 3 for gas transfer housed in a housing 2. In the oxygenator 1, blood flows along the outer side of the hollow fiber membranes 3, whereas oxygen-containing gas flows along the inner side thereof. An outer surface or outer layer 3a of the hollow fiber membrane 3 as a blood-contacting portion is coated with synthetic polymer 18 mainly formed of alkoxyalkyl(meta)acrylate containing a C(1–4)alkoxy group and a C(1–4)alkyl group. An intermediate layer 3b and inner layer 3c of the hollow fiber membranes 3 contain substantially no synthetic polymer.

In other words, the oxygenator 1 has a housing 2 and a lot of porous hollow fiber membranes 3 for gas transfer housed in the housing 2. In the oxygenator 1, blood flows along the outer side of the hollow fiber membrane 3 and oxygen-containing gas flows along the inner side thereof as the blood-contacting portion. The outer surface or the outer layer 3a of the hollow fiber membrane 3 is coated with the synthetic polymer 18 mainly formed of alkoxyalkyl(meta) acrylate containing repetitive combination of the unit as shown in chemical formula 1. The intermediate layer 3b and inner layer 3c of the hollow fiber membrane 3 contain substantially no synthetic polymer.

[chemical formula 1]

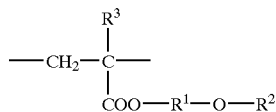

(where $R^1$ represents C(1–4)alkylene, $R^2$ represents C(1–4) alkyl, and $R^3$ represents H or $CH_3$ respectively.)

The oxygenator 1 of this embodiment is provided with a housing 2 having a blood inlet 6 and a blood outlet 7, a hollow fiber membrane bundle including a large number of porous hollow fiber membranes 3 for gas transfer disposed in the housing 2, a pair of partitions 4,5 for supporting both ends of the hollow fiber membrane bundle fluid-tightly, a blood chamber 12 defined by the partitions 4,5, the inner side of the housing 2 and the outer side of the hollow fiber membrane 3, a gas chamber formed in the hollow fiber membrane 3, and a gas inlet 8 and a gas outlet 9 communicated with the gas chamber or an inner space of the hollow fiber membrane 3.

More specifically, the oxygenator 1 according to this embodiment is provided with the tubular housing 2, a collective of a plurality of hollow fiber membranes 3 for gas transfer disposed in the tubular housing 2, and partitions 4,5 for holding both ends of the hollow fiber membrane 3 fluid-tightly in the housing 2. The inner space of the tubular housing 2 is divided into a first fluid chamber, i.e., a blood chamber 12 and a second fluid chamber, i.e., a gas chamber. The tubular housing 2 is further provided with a blood inlet 6 and a blood outlet 7 communicated with the blood chamber 12.

Provided above the partition 4 at a top end of the tubular housing 2 is a cap-like gas inflow header 10 having the gas inlet 8 as a second fluid inlet communicated with the inner space of the hollow fiber membrane 3, i.e., gas chamber. A gas inflow chamber 13 is defined by the outer surface of the partition 4 and the inner surface of the gas inflow header 10. The gas inflow chamber 13 is communicated with the gas chamber formed in the inner space of the hollow fiber membrane 3.

Provided below the partition 5 is a cap-like gas outflow header 11 having the gas outlet 9 as a second fluid outlet communicated with the inner space of the hollow fiber membrane 3. A gas outflow chamber 14 is defined by the outer surface of the partition 5 and the inner surface of the gas outflow header 11.

The hollow fiber membrane 3 is formed as a porous membrane having its inside diameter ranging from 100 to 1,000 $\mu$m. The thickness of the hollow fiber membrane 3 ranges from 5 to 200 $\mu$m, preferably from 10 to 100 $\mu$m, or more preferably, from 10 to 20 $\mu$m. The porosity ranges from 5 to 90%, preferably from 10 to 80%, or more preferably, from 30 to 60%. The micropore size ranges from 0.01 to 5 $\mu$m or preferably from 0.01 to 1 $\mu$m. The porous fiber membrane can be formed of hydrophobic polymer material such as polypropylene, polyethylene, polysulfone, polyacrylonitrile, polytetrafluoroethylene, and cellulose acetate. It is preferable to produce the porous fiber membrane using polyolefin resin, especially, polypropylene. It is further preferable to form micropores on the side wall using drawing or orienting method or solid phase/liquid phase separation method.

The tubular housing 2 is formed of a hydrophobic synthetic resin material, for example, polycarbonate, acryl styrene copolymer, acryl butylene styrene copolymer. The housing 2 is, for example, tubular shaped and preferably transparent such that the inside thereof can be easily observed.

According to this embodiment, a large number of porous hollow fiber membranes 3 from 5,000 to 100,000 are axially aligned in parallel with one another. Those hollow fiber membranes 3 are kept static by partitions 4, 5 fluid-tightly, each having both ends open to the respective ends of the housing 2. The partitions 4, 5 are formed of a potting agent, for example, polyurethane, silicone rubber or the like. The inner space of the housing 2 interposed between the partitions 4 and 5 is further parted into a gas chamber at the inner side of the hollow fiber membrane 3 and a blood chamber 12 at the outer side thereof.

Provided with the housing 2 fluid-tightly are a gas inflow header having a gas inlet 8 and a gas outflow header 11 having a gas outlet 9. Those headers 10, 11 are formed of hydrophobic synthetic resin material used for forming the housing 2. The headers 10, 11 are attached to the housing 2 through fusion using ultrasonic, high frequency, induction heating and the like. They can be adhered to the housing 2 using adhesive or mechanically fitted therewith. Alternatively they can be fixed to the housing 2 with a tightening ring (not shown). Consequently the whole area of the blood-contacting portion of the oxygenator 1 (inner side of the housing 2 and outer side of the hollow fiber membrane 3) is formed of the hydrophobic material.

Referring to FIG. 2, at least the blood-contacting portion of the oxygenator 1, i.e., outer surface or outer layer 3a of the hollow fiber membrane 3 is coated with, for example, synthetic polymer 18 mainly formed of alkoxyalkyl(meta) acrylate containing a C(1–4)alkoxy group and a C(1–4)alkyl group, or a synthetic polymer 18 mainly formed of alkoxyalkyl(meta)acrylate containing repetitive combination of the unit shown in the chemical formula 1. Further an intermediate layer 3b or an inner side 3c of the hollow fiber membrane 3 contains substantially no such synthetic polymer. That is, the intermediate layer 3b or the inner layer 3c of the hollow fiber membrane 3 maintains hydrophobic characteristics exhibited by the base material thereof, thus preventing leakage of the blood plasma component. Especially it is preferable that substantially no synthetic polymer exist in the intermediate layer 3b and inner layer 3c of the hollow fiber membrane 3. The hollow fiber membrane 3 has a path 3d constituting the gas chamber at its center.

As a result, adhesion and activation of the blood platelet to the blood-contacting portion of the hollow fiber membrane 3 is minimized and leakage of the blood plasma component is also minimized. Since the outer surface or the outer layer 3a of the hollow fiber membrane 3 (referred as the outer layer in this embodiment) as the blood-contacting portion is coated with the synthetic polymer 18, adhesion and activation of the blood platelet can be minimized. Since the intermediate layer 3b and the inner layer 3c of the hollow fiber membrane 3 contains substantially no synthetic polymer, they maintain hydrophobic characteristic of the base material of the membrane, thus preventing leakage of the blood plasma component with high efficiency.

The aforementioned synthetic polymer may be used to coat not only the hollow fiber membranes of the oxygenator but also whole surface of the blood-contacting portion for minimizing adhesion and activation of the blood platelet. Additionally as the contact angle of the blood-contacting portion is lowered, priming process can be simplified.

The hollow fiber membrane or a part thereof other than the blood-contacting portion (for example, a portion surrounded with the partition) does not have to be coated with the synthetic polymer. There may be no problem if the synthetic polymer is not applied to coat the portion that is not in contact with blood.

The synthetic polymer is mainly formed of alkoxyalkyl (meta)acrylate. The synthetic polymer contains alkoxyalkyl (meta)acrylate for a main component. alkoxyalkyl(meta) acrylate is formed of monopolymer or copolymer of one or more kinds selected from the following alkoxyalkyl(meta) acrylate, or copolymer of the alkoxyalkyl(meta)acrylate and monomer copolymerizable therewith.

The alkoxyalkyl(meta)acrylate contains both alkoxyalkylacrylate and alkoxyalkylmetaacrylate, for example, methoxymethylacrylate, methoxyethylacrylate, methoxypropylacrylate, ethoxymethylacrylate, ethoxyethylacrylate, ethoxypropylacrylate, ethoxybutylacrylate, propoxymethylacrylate, butoxyethylacrylate, methoxybutylacrylate, methoxymethylmetaacrylate, methoxyethylmetaacrylate, ethoxymethylmetaacrylate, ethoxyethylmetaacrylate, propoxymethylmetaacrylate, butoxyethylmetaacrylate. Especially it is preferable to use mthoxyethylacrylate.

The following monomer can be copolymerized with alkoxyalkyl(meta)acrylate: methylacrylate, ethylacrylate, propylacrylate, butylacrylate, 2-ethylhexylacrylate, methylmetaacrylate, ethylmetaacrylate, butylmetaacrylate, hexylacrylate, hexylmetaacrylate, ethylene, propylene and the like.

Preferably the copolymerizable monomer does not contain hydroxyl group or cationic group. The copolymer, formed of either random copolymer, block copolymer, or graft copolymer can be synthesized using a generally employed method, for example, radical polymerization, ion polymerization and polymerization using macromer.

Preferably the ratio of the copolymerizable monomer to any copolymer is equal to or less than 50%. If the ratio exceeds 50%, the effect derived from alkoxyalkyl(meta) acrylate will be deteriorated.

Preferably the weight-average molecular weight of the thus obtained alkoxylalkyl(meta)acrylate copolymer ranges from 10,000 to 1,000,000, and more preferably from 20,000 to 100,000.

A hollow fiber membrane oxygenator of external blood circulation type (hereinafter simply referred to as an oxygenator) of another embodiment shown in FIG. 3 can also be used.

An oxygenator 20 of this embodiment is provided with an inner tubular member 31 having blood holes 32 formed on its side, a tubular hollow fiber membrane bundle 22 containing a large number of porous hollow fiber membranes for gas transfer wound around outer surface of the inner tubular member 31, a housing 23 for holding the tubular hollow fiber membrane bundle 22 as well as the inner tubular member 31, partitions 25, 26 for keeping both ends of the tubular hollow fiber membrane bundle 22 static to the housing while keeping both ends of the hollow fiber membrane 3 open, a blood inlet 28 and a blood outlet 29 communicated with a blood chamber 17 formed in the housing 23, and a gas inlet 24 and a gas outlet 27 communicated with the inner side of the hollow fiber membrane 3.

Figure 4:
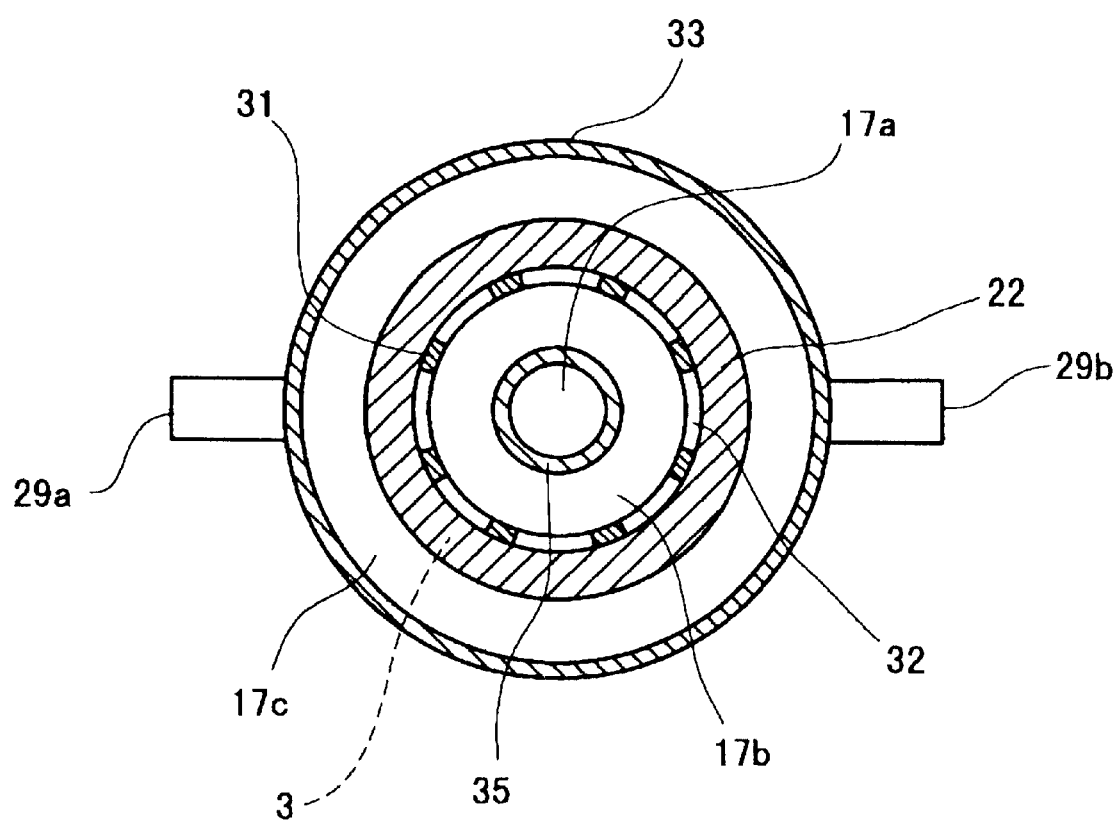
FIG. 4 is a sectional view taken along line A—A of FIG. 3.

FIG. 3 is a sectional view of the hollow fiber membrane oxygenator according to another embodiment of the present invention. FIG. 4 is a sectional view taken along line A—A of FIG. 3.

Referring to FIGS. 3 and 4, the housing 23 of the oxygenator 20 has an outer tubular member 33 for housing the inner tubular member 31 therein. The tubular hollow fiber membrane bundle 22 is disposed between the inner tubular member 31 and the outer tubular member 33. The housing 23 has either one of the blood inlet or the blood outlet communicated with the inner side of the inner tubular member and the other one of the blood inlet or the blood outlet communicated with the inner side of the outer tubular member.

More specifically, the housing 23 of the oxygenator 20 according to this embodiment is provided with the outer tubular member 33 and an inner tubular body 35 disposed within the inner tubular member 31 and having its top end open therein. The inner tubular body 35 has a blood inlet 28 at its (lower) end. Outwardly extending two blood outlets 29a, 29b are formed at each side of the outer tubular member. Only one blood outlet can work sufficiently.

The tubular hollow fiber membrane bundle 22 is wound around the outer surface of the inner tubular member 31. That is, the inner tubular member 31 serves as a core of the tubular hollow fiber membrane bundle 22. The inner tubular body 35 disposed within the inner tubular member 31 has its top end open in the vicinity of the first partition 25. The blood inlet 28 is formed at lower end extending from the inner tubular member 31.

The inner tubular body 35, the inner tubular member 31 having its outer surface wound with the hollow fiber membrane bundle 22 and the outer tubular member 33 are substantially concentrically arranged. The relationship between one (upper) end of the inner tubular member 31 having its outer surface wound with the hollow fiber membrane bundle 22 and one (upper) end of the outer tubular member 33 is kept to be concentric with the first partition 25. The inside of the inner tubular member and the space defined by the outer tubular member 33 and the outer surface of the hollow fiber membrane are kept fluid-tightly so as not to communicate with the external portion.

The portion slightly above the blood inlet 28 of the inner tubular body 35, the other (lower) end of the inner tubular member 31 having its outer surface wound with the hollow fiber membrane bundle 22 and the other (lower) end of the outer tubular member 33 are concentrically arranged with the second partition 26. The space defined by the inner tubular body 35 and the inside of the inner tubular member and the space defined by the outer tubular member 33 and the outer surface of the hollow fiber membrane are kept fluid-tightly so as not to communicate with the external portion. The partitions 25, 26 are formed of a potting agent, for example, polyurethane, silicone rubber or the like.

Therefore the oxygenator 20 of this embodiment has a blood chamber 17 composed of a blood inflow portion 17a forming the inner space of the inner tubular body 35, a first blood chamber 17b forming substantially a tubular space defined by the inner tubular body 35 and the inner tubular member, and a second blood chamber 17c forming substantially a tubular space defined by the hollow fiber membrane bundle 22 and the outer tubular member 33.

Entering through the blood inlet 28, blood flows into the blood inflow portion 17a to flow upwards within the inner tubular body 35 (blood inflow portion 17a) to flow out from an upper end 35a (open end) of the inner tubular body 35. The blood further flows into the first blood chamber 17b to pass through the opening 32 formed in the inner tubular member 31 and contacts the hollow fiber membranes for gas transfer. Then the blood flows into the second blood chamber 17c to flow out through the blood outlets 29a, 29b.

Fixed to one end of the outer tubular member 33 is a gas inflow member 41 having a gas inlet 24. Likewise fixed to the other end of the outer tubular member 33 is a gas outflow member 42 having a gas outlet 27. The blood inlet 28 of the inner tubular body 35 downwardly extends through the gas outflow member 42.

The outer tubular member 33 can be formed into annular shape, polygonal shape, and elliptic shape in cross section. Preferably it is formed into the annular shape. The inside diameter of the outer tubular member preferably ranges from 32 to 164 mm and the effective length (a whole length excluding the portion surrounded with the partition) ranges from 10 to 730 mm.

Figure 5:
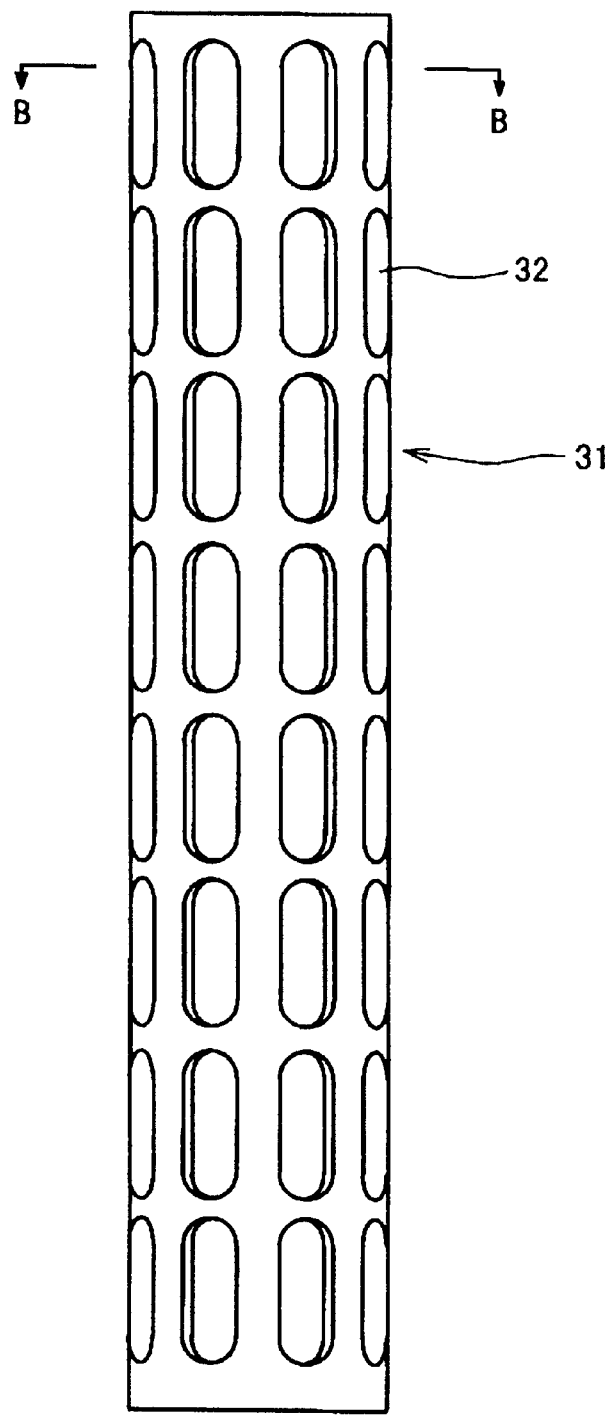
FIG. 5 is a front view of an example of an inner tubular member employed in the hollow fiber membrane oxygenator of external blood circulation type according to the present invention.
Figure 6:
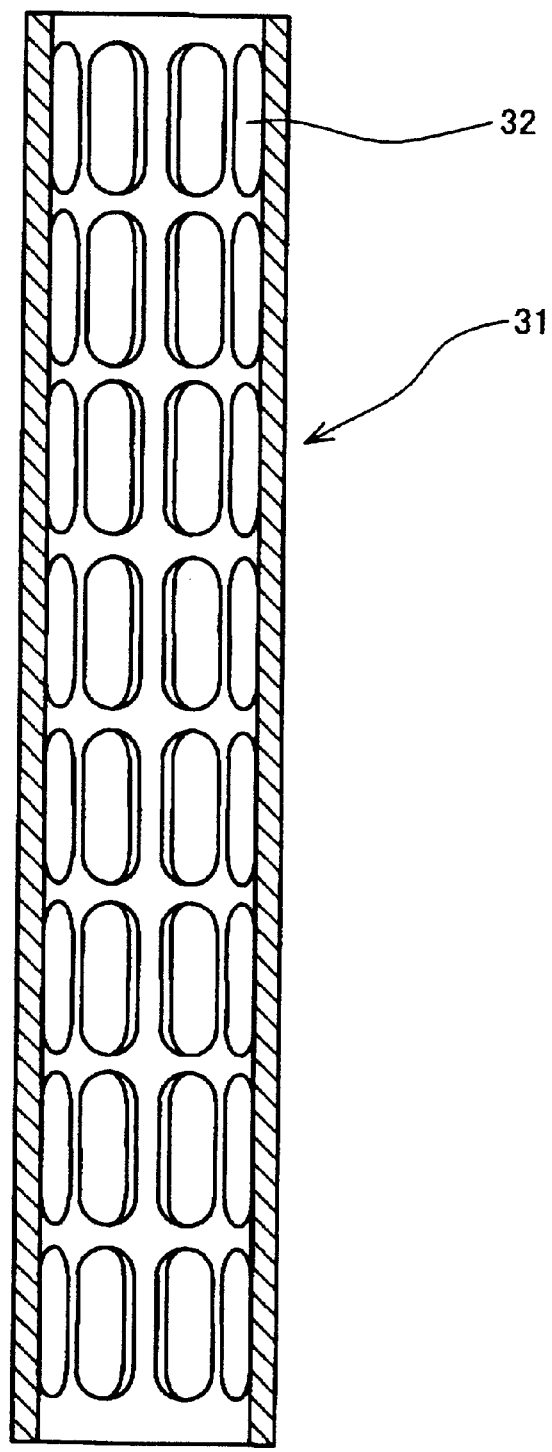
FIG. 6 is a longitudinal sectional view of the center of the inner tubular member shown in FIG. 5.
Figure 7:
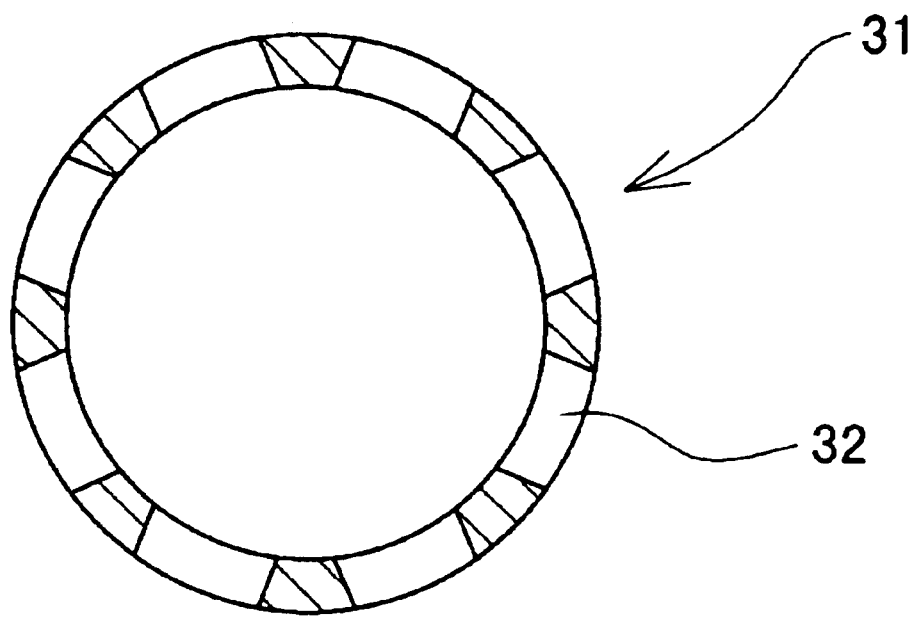
FIG. 7 is a sectional view taken along line B—B of FIG. 5.

The inner tubular member 31 may have annular shape, polygonal shape, and elliptic shape in cross section. Preferably it is formed into the annular shape. The outside diameter of the inner tubular member preferably ranges from 20 to 100 mm. The effective length (a whole length excluding the portion surrounded with the partition) preferably ranges from 10 to 730 mm. The inner tubular member 31 has a large number of blood openings 32 at its side. The total area of these blood openings 32 is preferably maximized while maintaining the required strength of the tubular member. As shown in FIG. 5 representing a front view of the inner tubular member, FIG. 6 representing a longitudinal sectional view of the center of the inner tubular member and FIG. 7 representing a view taken along line B—B of FIG. 5, a plurality of annular openings 32 (for example, 4 to 24 openings, 8 in this embodiment) are formed at a uniform interval around an outer periphery of the inner tubular member. Preferably a plurality of groups of the annular openings 32 are further formed at a uniform interval across the length of the inner tubular member (8 groups in this embodiment). The opening may have either circular, polygonal, or elliptic shape. However it is preferable to form the opening into the elliptic shape as shown in FIG. 5.

The inner tubular body 35 may have annular shape, polygonal shape, and elliptic shape in cross section. Preferably it is formed into the annular shape. The distance between the opening at top end of the inner tubular body 35 and the first partition 25 preferably ranges from 20 to 50 mm. The inside diameter of the inner tubular body 35 preferably ranges from 10 to 30 mm.

Preferably the thickness of the tubular hollow fiber membrane bundle 22 ranges from 5 to 35 mm, especially from 10 to 28 mm. The loading density of the hollow fiber membrane to the tubular space defined by the outer side of the tubular hollow fiber membrane bundle 22 and the inner side thereof preferably ranges from 40 to 85%, especially from 45 to 80%. The outside diameter of the hollow fiber membrane bundle 22 preferably ranges from 30 to 170 mm, especially from 70 to 130 mm.

The membrane can be used for the purpose of gas transfer as described above.

The hollow fiber membrane bundle 22 is formed in the following process. The hollow fiber membranes are wound around the inner tubular member 31 to form a hollow fiber membrane bobbin, utilizing the inner tubular member 31 as the core thereof. Both ends of the thus formed hollow fiber membrane bobbin are fixed to the partitions and are cut off, together with the inner tubular member 31 as the core. As a result, both ends of the hollow fiber membranes are open to the outer surface of the partition.

It is preferable to wind hollow fiber membranes one by one or a combination of a plurality thereof around the inner tubular member 31 such that they are substantially in parallel with one another and spaced at substantially a regular interval. The interval between the hollow fiber membranes adjacent to each other is preferably set to 1/10 to 1/1 of the outside diameter of the hollow fiber membranes. More specifically, the interval between the adjacent fiber membranes is set to the value preferably from 30 to 200 $\mu$m and, more preferably from 50 to 180 $\mu$m.

It is preferable to form the hollow fiber membrane bundle 22 by winding the hollow fiber membranes one by one or a combination of a plurality thereof around the inner tubular member 31 such that they are substantially in parallel with one another and spaced at substantially a regular interval. Moreover, preferably, the hollow fiber membranes are wound around the inner tubular member 31 by operating a rotary member for rotating the inner tubular member 31 and a winder for threading the hollow fiber membranes under the condition where the following equation is satisfied.

traverse [mm/lot]×$n$(integer)=traverse swinging width×2±(outside diameter of hollow fiber membrane+interval between adjacent hollow fiber membranes)×the number of hollow fiber membranes wound around the inner tubular member (Equation 1)

The above-described method of forming the hollow fiber membrane bundle 22 minimizes non-uniformity in the blood flow. The above-described integer (n) representing the relationship between the number of rotations of the winding rotary member and the number of reciprocations of the winder should be set to 1 to 5 and preferably from 2 to 4.

The oxygenator described in this embodiment is constructed to allow blood to flow and pass through the hollow fiber membrane bundle 22 from inner side thereof, further flow outside the hollow fiber membrane bundle 22 and flow out from the oxygenator 20. However the oxygenator 20 of the present invention is not limited to this type. Conversely, for example, the oxygenator 20 can be constructed to allow blood to flow and pass through the hollow fiber membrane bundle 22 from outer side thereof, further flow inside the hollow fiber membrane bundle 22, and flow out from the oxygenator 20.

Referring to FIG. 2, in the oxygenator 20, at least the outer side or the outer layer 3a of the hollow fiber membrane 3 is coated with synthetic polymer mainly formed of alkoxyalkyl (meta)acrylate containing a C(1–4)alkoxy group and a C(1–4)alkyl group, or synthetic polymer 18 mainly formed of alkoxyalkyl(meta)acrylate containing repetitive combination of the unit shown in the above chemical formula 1. The intermediate layer 3b and the inner layer 3c of the hollow fiber membrane 3 contain substantially no synthetic polymer. The hollow fiber membrane 3 has a path 3d constituting the gas chamber formed at the center thereof.

The hollow fiber membranes of the oxygenator 20 are sequentially laminated in contact with each other to form a bobbin-like structure having complicated blood path and a large number of narrow portions. Therefore this type of oxygenator has an excellent gas transfer capability. On the other hand, it may be inferior to the oxygenator of external blood circulation type which is not formed into the bobbin like structure in view of adhesion and activation characteristics of the blood platelet.

The outer surface or the outer layer 3a of the hollow fiber membrane 3 (referred as the outer layer in this embodiment) as the blood-contacting portion of the hollow fiber membrane of the oxygenator is coated with the aforementioned synthetic polymer 18. As a result, adhesion and activation of the blood platelet at the blood-contacting surface of the hollow fiber membrane 3 can be minimized. Furthermore there is no synthetic polymer 18 contained in the intermediate layer 3b and the inner layer 3c of the hollow fiber membrane such that hydrophobicity exhibited by the base material of the membrane can be maintained, thus preventing leakage of blood plasma component.

The synthetic polymer may be used to coat not only the hollow fiber membranes but also a whole area of blood-contacting portion of the oxygenator. The hollow fiber membrane or a part thereof other than the blood-contacting portion (for example, the portion surrounded with the partition, the contact portion between the hollow fiber membranes) does not have to be coated with the synthetic polymer.

Described below is a method of producing the hollow fiber membrane oxygenator of external blood circulation type.

The oxygenator (for example, having a structure as shown in FIG. 1 or FIG. 3) is fabricated. Then liquid containing synthetic polymer mainly formed of the aforementioned alkoxyalkyl(meta)acrylate or the solution thereof is supplied to flow through the blood path of the oxygenator such that the blood-contacting portion is coated with the aforementioned synthetic polymer.

It is preferable, in this case, to use solvent having solubility parameter value to the synthetic polymer ranging from 38 to 40 (MPa)$^{1/2}$. When the solvent contains a plurality of components, for example, 2 components (solvent A and solvent B), the solubility parameter value can be derived from the following equation 2.

Solubility parameter value=Solubility parameter of A×Volume of A/Total volume+Solubility parameter of B×Volume of B/Total volume (Equation 2)

When the solvent contains 3 components(solvent A, solvent B and C), the solubility parameter value can be derived from the following equation 3.

Solubility parameter value=Solubility parameter of A×Volume of A/Total volume+Solubility parameter of B×Volume of B/Total volume+Solubility parameter of C×Volume of C/Total volume (Equation 3)

It is preferable to use the solvent which cannot penetrate into the micropore of the hollow fiber membrane to reach its center. It is, thus, preferable to use the solvent containing water to some extent. In order to achieve the aforementioned point and make the synthetic polymer soluble, it is preferable to use two-component solvent, containing water and alcohol, more specifically, mixture of water, methanol and ethanol.

Concentration of alkoxyalkyl(meta)acrylate contained in the solvent ranges from 0.01 to 5.0 wt. %, and preferably from 0.1 to 1.0 wt.%. The hollow fiber membrane may be subjected to coating of the synthetic polymer solution prior to fabrication of the oxygenator. The coating method known to those skilled in the art can be used, for example, dipping process, spray process and the like using polymer solution.

In the oxygenator of this invention, a synthetic polymer coated to the outer surface or the outer layer of said hollow fiber membrane is preferable a solidification material of a solution of the synthetic polymer using a solvent having a solubility parameter value ranging from 38 to 40 (Mpa)$^{1/2}$. The solvent is preferable a mixture of water and alcohol. The solvent is more preferable a mixture of water, methanol and ethanol.

Embodiment

Embodiment 1

Approximately 20,000 hollow fiber membranes made of porous polypropylene each having inside diameter of 195 μm, outside diameter of 295 μm and porosity of about 35% were disposed in the housing so as to fabricate the hollow fiber membrane oxygenator of external blood circulation type having the membrane area of 1.8 m$^2$ as shown in FIG. 1.

The synthetic polymer solution (concentration: 0.5 wt. %) was prepared by dissolving polymethoxyethylacrylate (average molecular weight: 70,000) in the solvent containing water, methanol and ethanol by ratio of 6:1:3 (solubility parameter value to polymethoxyethylacrylate: 38.8(Mpa)$^{1/2}$).

The prepared synthetic polymer solution was supplied to the blood path side of the oxygenator to coat the whole area of the blood-contacting portion thereof with the synthetic polymer. Then the hollow fiber membrane oxygenator of external blood circulation type according to the present invention was fabricated.

Comparative Example 1

The hollow fiber membrane oxygenator having the blood-contacting portion not coated with the aforementioned synthetic polymer was prepared as a comparative example 1.

Comparative Example 2

About 24,000 porous polypropylene hollow fiber membranes each having inside diameter of 195 μm, outside diameter of 295 μm and porosity of about 35% were disposed in the housing for fabricating the hollow fiber membrane oxygenator of internal blood circulation type having a membrane area of 2.0 m$^2$.

Comparative Example 3

The synthetic polymer solution (concentration: 0.5 wt. %) was prepared by dissolving polymethoxyethylacrylate (average molecular weight: 70,000) identical to the one used in the embodiment 1 in single-component solvent of methanol (solubility parameter value to polymethoxyethylacrylate: 29.7 (MPa)$^{1/2}$).

The thus prepared synthetic polymer solution was supplied to the blood path of the oxygenator to coat the whole area of the blood-contacting portion thereof with the synthetic polymer. Then the oxygenator as a comparative example 3 was fabricated.

Experiment 1

Each oxygenator of the embodiment 1 and comparative examples 1 to 3 was incorporated with the extracorporeal blood circulation circuit and filled with 200 ml of freshly collected blood containing added heparin and 350 ml of Ringer solution containing lactic acid. The blood kept at 37° C. was perfused within the circuit at 1 L/min. for 4 hours. For each case, the number of blood platelet and β-TG were measured. Tables 1 and 2 show the respective measurement results. The term β-TG represents the degree of activation of the blood platelet. After blood circulation, it was checked for any leakage of blood plasma. Table 3 shows the check result.

TABLE 1

| Circulation period | Change in blood platelet content during circulation (%, compared with the value measured before circulation) | | | | | |
|---|---|---|---|---|---|---|
| (minute) | 0 | 3 | 30 | 60 | 120 | 240 |
| Embodiment 1 | 100 | 88 | 91 | 85 | 87 | 86 |
| Comparative Example 1 | 100 | 37 | 1 | 8 | 20 | 48 |
| Comparative Example 2 | 100 | 97 | 69 | 61 | 80 | 101 |

TABLE 2

| Circulation | Change in β-TG during circulation (ng/ml) | | | | |
|---|---|---|---|---|---|
| period(minute) | 3 | 30 | 60 | 120 | 240 |
| Embodiment 1 | 12 | 19 | 27 | 39 | 69 |
| Comparative Example 1 | 344 | 1527 | 1643 | 1747 | 1853 |
| Comparative Example 2 | 18 | 280 | 450 | 542 | 594 |

TABLE 3

| Circulation period (minute) | Leakage of blood plasma after circulation 240 |
|---|---|
| Embodiment 1 | No leakage observed |
| Comparative Example 1 | No leakage observed |
| Comparative Example 2 | No leakage observed |
| Comparative Example 3 | Leakage observed |

Embodiment 2

The inner tubular member used in this embodiment had a shape shown in FIGS. 5 to 7, an outside diameter of 50 mm and a length of 188 mm. Four hollow fiber membranes made of porous polypropylene and each having inside diameter of 195 μm, outside diameter of 295 μm and porosity of about 35% were wound around the inner tubular member at a regular interval. Then a hollow fiber membrane bobbin was formed by winding a plurality of hollow fiber membranes adjacent to the hollow fiber membrane of the four hollow fiber membranes at the same interval as being set for the previously wound membranes.

The hollow fiber membrane bobbin was accommodated in the outer tubular member. One end of the hollow fiber membrane bobbin was fixed with a potting agent and then cut off. The inner tubular body was inserted into the hollow fiber membrane bobbin. Thereafter, the other end of the bobbin was fixed with the potting agent. The other end of the hollow fiber membrane bobbin was cut off without cutting the inner tubular body by rotating the hollow fiber membrane bobbin while keeping the inner tubular body centered. Then a gas inflow member and a gas outflow member were installed. In this manner, an oxygenator having a hollow fiber membrane bundle constructed as shown in FIG. 3 was prepared. The area of each hollow fiber membrane was set to 2.5 m$^2$. The interval between the hollow fiber membranes was 50 μm, the thickness of the hollow fiber membrane bundle was 10 mm, effective length thereof was 153 mm, and the loading density in the area defined by the hollow fiber membrane bundle was 65%.

The synthetic polymer solution (concentration: 0.5 wt. %) was prepared by dissolving polymethoxyethylacrylate (average molecular weight: 70,000) in the solvent containing mixture of water, methanol and ethanol by ratio of 6:1:3 (solubility parameter to polymethoxyethylacrylate: 38.8 (MPa)$^{1/2}$).

The thus prepared synthetic polymer solution was supplied to the aforementioned blood path of the oxygenator such that the whole area of the blood contacting portion of the oxygenator is coated with the synthetic polymer.

Comparative Example 5

The oxygenator having the blood-contacting portion uncoated with the synthetic polymer was used as the comparative example 5.

Comparative Example 6

The synthetic polymer solution (concentration: 0.5 wt. %) was prepared by dissolving polymethoxyethylacrylate (average molecular weight: 70,000) identical to the one used in the embodiment 1 in the single-component solvent of methanol (solubility parameter value to polymethoxyethylacrylate: 29.7 (MPa)$^{1/2}$).

The thus prepared synthetic polymer solution was supplied to the blood path of the oxygenator to coat the whole area of the blood-contacting portion thereof with the synthetic polymer. The oxygenator was fabricated as the comparative example 6.

Experiment 3

Each oxygenator of embodiment 2 and comparative examples 5, 6 was incorporated with the extracorporeal blood circulation circuit and filled with 200 ml of freshly collected blood containing added heparin and 350 ml of Ringer solution containing lactic acid. The blood kept at 37° C. was perfused within the circuit at 1 L/min. for 4 hours. For each case, the number of blood platelet and β-TG were measured. Tables 4 and 5 show the respective measurement results. The term β-TG represents the degree of activation of the blood platelet. After blood circulation, it was checked for any leakage of blood plasma. Table 6 shows the check result.

TABLE 4

| Circulation period | Change in blood platelet content during circulation (%, compared with the value measured before circulation) | | | | | |
|---|---|---|---|---|---|---|
| (minute) | 0 | 3 | 30 | 60 | 120 | 240 |
| Embodiment 2 | 100 | 93 | 88 | 90 | 91 | 90 |
| Comparative Example 5 | 100 | 22 | 3 | 9 | 25 | 62 |

TABLE 5

| Circulation | Change in β-TG during circulation (ng/ml) | | | | |
|---|---|---|---|---|---|
| period(minute) | 3 | 30 | 60 | 120 | 240 |
| Embodiment 2 | 9 | 22 | 34 | 44 | 80 |
| Comparative Example 5 | 431 | 1490 | 1457 | 1507 | 1577 |

TABLE 6

| Circulation period (minute) | Leakage of blood plasma after circulation 240 |
|---|---|
| Embodiment 2 | No leakage observed |
| Comparative Example 5 | No leakage observed |
| Comparative Example 6 | leakage observed |

In the oxygenator of the present invention, the outer surface or the outer layer of the hollow fiber membrane as the blood-contacting portion of the hollow fiber membrane is coated with the aforementioned synthetic polymer. As a result, adhesion and activation of the blood platelet can be minimized. As the synthetic polymer does not exist in the intermediate layer and inner layer of the hollow fiber membrane, the intermediate layer and inner layer of the hollow fiber membrane maintain hydrophobic capability exhibited by the base material of the membrane, thus preventing the leakage of the blood plasma.

While the preferred form of the present invention has been described, it is to be understood that modifications will be apparent to those skilled in the art without departing from the spirit of the invention. The scope of the invention, therefore, is to be determined solely by the following claims.

What is claimed is:

1. A hollow fiber membrane oxygen comprising
   a housing, and
   a porous hollow fiber membrane for gas transfer housed in said housing, allowing blood to flow at an outer surface of said hollow fiber membrane and oxygencontaining gas to flow through am inside of the hollow fiber membrane, wherein:
      the out surface or an outer layer of said hollow fiber membrane as a blood-contacting portion is coated with synthetic polymer mainly formed of alkoxyalkyl(meth)acrylate containing a C(1–4) alkoxy group and C(1–4)alkyl group, said synthetic polymer existing on said hollow fiber membrane during extracorporeal blood circulation; and
      an intermediate layer and an inner layer of said hollow fiber membrane are substantially devoid of said synthetic polymer, and the inner layer and intermediate layer of the hollow fiber membrane maintain hydrophobic characteristics exhibited by material forming the hollow fiber membrane to prevent leakage of a blood plasma component.

2. A hollow fiber membrane oxygenator as claimed in claim 1, wherein polymethoxyethylacrylate is used as said synthetic polymer.

3. A hollow fiber membrane oxygenator as claimed in claim 1, wherein said hollow fiber membrane oxygenator comprises:
   the housing having a blood inlet and a blood outlet;
   the hollow fiber membrane bundle being a hollow fiber membrane bundle formed of a large number of porous hollow fiber membranes for gas transfer housed in said housing;
   a pair of partitions for supporting both ends of said hollow fiber membrane bundle in said housing in a fluid-tight manner;
   a blood chamber defined by said partition, an inner surface of said housing and an outer surface of said hollow fiber membrane;
   a gas chamber formed inside of said hollow fiber membrane; and
   a gas inlet and a gas outlet communicated with said gas chamber.

4. A hollow fiber membrane oxygenator as claimed in claim 1, wherein said hollow fiber membrane oxygenator comprises:
   an inner tubular member having an opening formed on its side surface which allows blood flow to pass therethrough;
   the hollow fiber membrane bundle being a tubular hollow fiber membrane bundle formed a large number of porous hollow fiber membranes for gas transfer, which are wound around an outer surface of said inner tubular member;
   the housing housing said tubular hollow fiber membrane bundle and said inner tubular member;
   partitions for fixing both ends of said tubular hollow fiber membrane bundle to said housing;
   a blood inlet and a blood outlet communicating with a blood chamber formed in said housing; and
   a gas inlet and a gas outlet communicated with an inside of said hollow fiber membrane.

5. A hollow fiber membrane oxygenator as claimed in claim 4, wherein said inner tubular member has some openings formed on its side surface which allows blood flow to pass therethrough.

6. A hollow fiber membrane oxygenator as claimed in claim 1, wherein a whole area of the blood-contacting portion of said hollow fiber membrane is coated with said synthetic polymer.

7. A hollow fiber membrane oxygenator as claimed in claim 1, wherein said synthetic polymer coated to the outer surface or the outer layer of said hollow fiber membrane is a solidification material of a solution of the synthetic polymer using a solvent having a solubility parameter value ranging from 38 to 40 $MPa)^{1/2}$.

8. A hollow fiber membrane oxygenator as claimed in claim 7, wherein said solvent is a mixture of water and alcohol.

9. A hollow fiber membrane oxygenator as claimed in claim 7, wherein said solvent is a mixture of water, methanol and ethanol.

10. A hollow fiber membrane oxygenator comprising
    a housing, and a porous hollow fiber membrane for gas transfer housed in said housing, allowing blood to flow at an outer surface of said hollow fiber membrane and oxygen-containing gas to flow through an inside of the hollow fiber membrane, wherein:

the outer surface or an outer layer of said hollow fiber membrane as a blood-contacting portion is coated with synthetic polymer mainly formed of alkoxyalkyl(meth)acrylate containing repetitive combination of the unit shown in the following chemical formula 1, said synthetic polymer existing on said hollow fiber membrane during extracorporeal blood circulation; and

[chemical formula 1]

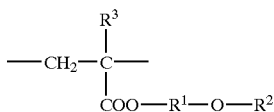

(where $R^1$ represents C(1–4)alkylene, $R^2$ represents C(1–4)alkyl, and $R^3$ represents H or $CH_3$ respectively)

an inner layer and an intermediate layer of said hollow fiber membrane are substantially devoid of said synthetic polymer, and the inner layer and the intermediate layer of said hollow fiber membrane maintain hydrophobic characteristics exhibited by material forming the hollow fiber membrane to prevent leakage of a blood plasma component.

11. A hollow fiber membrane oxygenator as claimed in claim 10, wherein polymethoxyethylacrylate is used as said synthetic polymer.

12. A hollow fiber membrane oxygenator as claimed in claim 10, wherein said hollow fiber membrane oxygenator comprises:

the housing having a blood inlet and a blood outlet;

the hollow fiber membrane bundle being a hollow fiber membrane bundle formed of a large number of porous hollow fiber membranes for gas transfer housed in said housing;

a pair of partitions for supporting both ends of said hollow fiber membrane bundle in said housing in a fluid-tight manner;

a blood chamber defined by said partition, an inner surface of said housing and an outer surface of said hollow fiber membrane;

a gas chamber formed inside of said hollow fiber membrane; and a gas inlet and a gas outlet communicated with said gas chamber.

13. A hollow fiber membrane oxygenator as claimed in claim 10, wherein said hollow fiber membrane oxygenator comprises:

an inner tubular member having an opening formed on its side surface which allows blood flow to pass therethrough;

the hollow fiber membrane bundle being a tubular hollow fiber membrane bundle formed a large number of porous hollow fiber membranes for gas transfer, which are wound around an outer surface of said inner tubular member;

the housing housing said tubular hollow fiber membrane bundle and said inner tubular member;

partitions for fixing both ends of said tubular hollow fiber membrane bundle to said housing;

a blood inlet and a blood outlet communicating with a blood chamber formed in said housing; and a gas inlet and a gas outlet communicated with the inside of said hollow fiber membrane.

14. A hollow fiber membrane oxygenator as claimed in claim 13, wherein said inner tubular member has openings formed on its side surface which allows blood flow to pass therethrough.

15. A hollow fiber membrane oxygenator as claimed in claim 10, wherein a whole area of the blood-contacting portion of said hollow fiber membrane oxygenator is coated with said synthetic polymer.

16. A hollow fiber membrane oxygenator as claimed in claim 10, wherein said synthetic polymer coated to the outer surface or the outer layer of said hollow fiber membrane is a solidification material of a solution of the synthetic polymer using a solvent having a solubility parameter value ranging from 38 to 40 $(MPa)^{1/2}$.

17. A hollow fiber membrane oxygenator as claimed in claim 16, wherein said solvent is a mixture of water and alcohol.

18. A hollow fiber membrane oxygenator as claimed in claim 16, wherein said solvent is a mixture of water, methanol and ethanol.

19. A hollow fiber membrane oxygenator comprising a housing, and a porous hollow fiber membrane for gas transfer housed in said housing, allowing blood to flow at an outer surface of said hollow fiber membrane and oxygen-containing gas to flow through an inside of the hollow fiber membrane, wherein:

the outer surface or an outer layer of said hollow fiber membrane as a blood-contacting portion is coated with synthetic polymer mainly formed of alkoxyalkyl(meta)acrylate containing a C(1–4) alkoxy group and a C(1–4)alkyl group; said synthetic polymer existing on said hollow fiber membrane during extracorporeal blood circulation;

an intermediate layer and an inner layer of said hollow fiber membrane are substantially devoid of synthetic polymer, said synthetic polymer coated at the outer surface or the outer layer of said hollow fiber membrane is a solidification material of a solution of the synthetic polymer using a solvent that is a mixture of water and alcohol having a solubility parameter value ranging from 38 to 40 $(MPa)^{1/2}$, an entire area of the blood-contacting portion of said hollow fiber membrane oxygenator is coated with said synthetic polymer.

20. A hollow fiber membrane oxygenator as claimed in claim 19, wherein said solvent is a mixture of water, methanol and ethanol.

21. A hollow fiber membrane oxygenator comprising a housing, and a porous hollow fiber membrane for gas transfer housed in said housing, allowing blood to flow at an outer surface of said hollow fiber membrane and oxygen-containing gas to flow through an inside of the hollow fiber membrane, wherein:

the outer surface or an outer layer of said hollow fiber membrane as a blood-contacting portion is coated with synthetic polymer mainly formed of alkoxyalkyl(meta)acrylate containing repetitive combination of the unit shown in the following chemical formula 1, said synthetic polymer existing on said hollow fiber membrane during an extracorporeal blood circulation

[chemical formula 1]

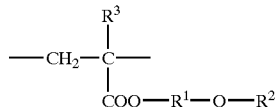

(where $R^1$ represents C(1–4)alkylene, $R^2$ represents C(1–4)alkyl, and $R^3$ represents H or $CH_3$ respectively);

an intermediate layer or an inner layer of said hollow fiber membrane is substantially devoid of said synthetic polymer, said synthetic polymer coated to the outer surface or the outer layer of said hollow fiber membrane is a solidification material of a solution of the synthetic polymer using a solvent that is a mixture of water and alcohol having a solubility parameter value ranging from 38 to 40 $(Mpa)^{1/2}$, and an entire area of the blood-contacting portion of said hollow fiber membrane oxygenator is coated with said synthetic polymer.

22. A hollow fiber membrane oxygenator as claim 21, wherein said solvent is a mixture of water, methanol and ethanol.

23. A hollow fiber membrane oxygenator comprising a housing, and porous hollow fiber membranes for gas transfer housed in said housing, allowing blood to flow at an outer surface of said hollow fiber membranes and oxygen-containing gas to flow through an inside of the hollow fiber membranes, wherein:

the hollow fiber membranes are sequentially laminated in contact with each other to form a bobbin-like structure having a complicated blood path and a large number of narrow portions, the outer surface or an outer layer of said hollow fiber membranes as a blood-contacting portion is coated with synthetic polymer mainly formed of alkoxyalkyl(meta)acrylate containing a C(1–4) alkoxy group and a C(1–4)alkyl group, said synthetic polymer existing on said hollow fiber membrane during extracorporeal blood circulation; and an intermediate layer and an inner layer of said hollow fiber are substantially devoid of said synthetic polymer, and the inner layer and the intermediate layer of the hollow fiber membranes maintain hydrophobic characteristics exhibited by a material forming the hollow fiber membranes to prevent leakage of a blood plasma component.

24. A hollow fiber membrane oxygenator comprising a housing, and porous hollow fiber membranes for gas transfer housed in said housing, allowing blood to flow at an outer surface of said hollow fiber membranes and oxygen-containing gas to flow through an inside of the hollow fiber membranes, wherein:

the hollow fiber membranes are sequentially laminated in contact with each other to form a bobbin-like structure having a complicated blood path and a large number of narrow portions, the outer surface or an outer layer of said hollow fiber membranes as a blood-contacting portion is coated with synthetic polymer mainly formed of alkoxyalkyl(meta)acrylate containing repetitive combination of the unit shown in the following chemical formula 1, said synthetic polymer existing on said hollow fiber membrane during extracorporeal blood circulation; and

[chemical formula 1]

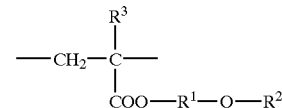

(where $R^1$ represents C(1–4)alkylene, $R^2$ represents C(1–4)alkyl, and $R^3$ represents H or $CH_3$ respectively.)

an intermediate layer and an inner layer of said hollow fiber membranes are substantially devoid of said synthetic polymer, and the inner and the intermediate layers of the hollow fiber membranes maintain hydrophobic characteristics exhibited by a material forming the hollow fiber membranes to prevent leakage of a blood plasma component.

* * * * *

UNITED STATES PATENT AND TRADEMARK OFFICE
CERTIFICATE OF CORRECTION

PATENT NO.   : 6,495,101 B1
DATED        : December 17, 2002
INVENTOR(S)  : Kenji Yokoyama et al.

It is certified that error appears in the above-identified patent and that said Letters Patent is hereby corrected as shown below:

Column 13,
Line 50, "oxygen" is changed to -- oxygenator --.
Line 54, "oxygencon" is changed to -- oxygen con- --.
Line 55, "am" is changed to -- an --.
Line 57, "out" is changed to -- outer --.
Line 61, "and C(1-4)alkyl" is changed to -- and a C(1-4) alkyl --.

Column 17,
Line 47, "fiber are" is changed to -- fiber membranes are --.

Signed and Sealed this

Fourth Day of November, 2003

JAMES E. ROGAN
*Director of the United States Patent and Trademark Office*